(12) United States Patent
Forgang et al.

(10) Patent No.: US 8,089,277 B2
(45) Date of Patent: Jan. 3, 2012

(54) SYSTEM AND METHOD IMPLEMENTING INHERENTLY CONDUCTING POLYMERS FOR DOWNHOLE APPLICATIONS

(75) Inventors: Stanislav Wilhelm Forgang, Houston, TX (US); Rocco DiFoggio, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/120,698

(22) Filed: May 15, 2008

(65) Prior Publication Data

US 2009/0015253 A1 Jan. 15, 2009

Related U.S. Application Data

(60) Provisional application No. 60/917,956, filed on May 15, 2007.

(51) Int. Cl.
*G01V 3/00* (2006.01)
(52) U.S. Cl. .................................................. 324/303
(58) Field of Classification Search ........... 324/300–322
See application file for complete search history.

(56) References Cited

U.S. PATENT DOCUMENTS

| 4,756,969 | A  | * | 7/1988  | Takeda ........................ 428/372 |
| 6,111,408 | A  | * | 8/2000  | Blades et al. ................. 324/303 |
| 6,220,371 | B1 | * | 4/2001  | Sharma et al. ................. 175/50 |
| 6,866,306 | B2 |   | 3/2005  | Boyle et al. |
| 7,124,596 | B2 | * | 10/2006 | DiFoggio et al. ............ 62/259.2 |
| 7,395,704 | B2 |   | 7/2008  | DiFoggio |
| 7,559,358 | B2 | * | 7/2009  | DiFoggio et al. ............. 166/66.6 |
| 2002/0135179 | A1 | * | 9/2002 | Boyle et al. .................. 285/21.1 |
| 2005/0109098 | A1 | * | 5/2005 | DiFoggio .................... 73/152.55 |
| 2005/0216075 | A1 | * | 9/2005 | Wang et al. ................... 623/1.15 |
| 2006/0102871 | A1 | * | 5/2006 | Wang et al. ............. 252/62.51 R |
| 2008/0149348 | A1 | * | 6/2008 | DiFoggio et al. .............. 166/381 |

OTHER PUBLICATIONS

International Search Report for International Application No. PCT/US2008/063645. Mailed Feb. 12, 2009.
Written Opinion of the International Searching Authority for International Application No. PCT/US2008/063645. Mailed Feb. 12, 2009.
The effects of temperature and aging on Young's moduli of polymeric based flexible substrates. [online]: [retrieved on Aug. 7, 2008]; retrieved from the Internet http://cat.inist.fr/?aModele=afficheN&cpsidt=1061278.
Big and Bendable Continued. [online]: [retrieved on Aug. 7, 2008]; retrieved from the internet http://www.spectrum.ieee.org/sep05/1676/3.
Flex Facts. [online]: [retrieved on Aug. 7, 2008]; retrieved fromm the Internet http://www.lenthor.com/flex-facts/index.htm.
Eeonyx Corporation. [online]: [retrieved on Aug. 7, 2008]; retrieved from the internet http://www.eeonyx.com/.
Conductive Range of ICP. [online]: [retrieved on Aug. 7, 2008]; retrieved from the internet http://www.baytron.com/index.php?page_id=998.
What is CLEVIOS?. [online]: [retrieved on Aug. 7, 2008]; retrieved from the internet http://www.baytron.com/index/php?page_id=937.
Technical Introduction Conductive Polyermers. [online]: [retrieved on Aug. 7, 2008]; retrieved from the Internet http://www.baytron.com/index.php?page_id=935.

(Continued)

*Primary Examiner* — Dixomara Vargas
(74) *Attorney, Agent, or Firm* — Cantor Colburn LLP

(57) ABSTRACT

Embodiments of conductive polymers and instruments using the conductive polymers in geophysical exploration are provided. Methods for fabrication are included.

3 Claims, 1 Drawing Sheet

OTHER PUBLICATIONS

Inherently Conductive Polymer Products. [online]: [retrieved on Aug. 7, 2008]; retrieved from the internet http://www.baytron.com/index.php?page_id=603&PHPSESSID=2d607602d22f5dee540784....

Fang, et al. "Determination of Structural Dip and Azimuth from LWD Azimuthal Propagation Resistivity Measurements in Anisotropic Formations". SPE 116123. SPE Annual Technical Conference and Exhibition held in Denver, Colorado, USA Sep. 21-24, 2008.

* cited by examiner

SYSTEM AND METHOD IMPLEMENTING INHERENTLY CONDUCTING POLYMERS FOR DOWNHOLE APPLICATIONS

CROSS REFERENCE TO RELATED APPLICATION

The present application claims priority to U.S. Provisional Patent Application Ser. No. 60/917,956, filed May 15, 2007, the entire contents of which are specifically incorporated herein by reference.

BACKGROUND OF THE INVENTION

1. Field of the Invention

The teachings herein relate to geophysical exploration, and in particular, to use of conducting polymers in such exploration.

2. Description of the Related Art

A large variety of tools, instruments and techniques are used for geophysical exploration. A number of these make use of electronic components to achieve a desired result. As is known in the art, the tools and instruments are inserted into a borehole (also referred to as a "wellbore") which has been drilled into subterranean formations of interest.

The downhole environment typically presents harsh conditions for electromagnetic equipment, thereby affecting electromagnetic properties of the equipment. For example, elevated downhole temperatures can not only change electrical conductivities of the equipment, but the temperatures can also damage the equipment, such as by melting solder joints present on printed circuit board (PCBs).

New materials are coming available for use in electrical and electronic systems. For example, consider conductive polymers. A conductive polymer is referred to typically as an organic polymer semiconductor, or an organic semiconductor. Roughly, there are two classes: charge transfer complexes and conductive polyacetylenes. The latter include polyacetylene itself as well as polypyrrole, polyaniline, and their derivatives. Other embodiments of conductive polymers are known.

Most commercially produced organic polymers are electrical insulators. Conductive organic polymers often have extended delocalized bonds (often composed of aromatic units). At least locally, these create a band structure similar to silicon, but with localized states. When charge carriers (from the addition or removal of electrons) are introduced into the conduction or valence bands (see below) the electrical conductivity increases dramatically. Technically almost all known conductive polymers are semiconductors due to the band structure and low electronic mobility. However, so-called zero band gap conductive polymers may behave like metals. The most notable difference between conductive polymers and inorganic semiconductors is the mobility, which until very recently was dramatically lower in conductive polymers than their inorganic counterparts, though recent advancements in molecular self-assembly are closing that gap.

Delocalization can be accomplished by forming a conjugated backbone of continuous overlapping orbitals. For example, alternating single and double carbon-carbon bonds can form a continuous path of overlapping p-orbitals. In polyacetylene, but not in most other conductive polymers, this creates degeneracy in the frontier molecular orbitals. This leads to the filled (electron containing) and unfilled bands (valence and conduction bands respectively) resulting in a semiconductor.

Conductive polymers are also referred to in the art as "Inherently Conducting Polymers," and "Intrinsically Conducting Polymers," (ICP's).

What are needed are improved electronic and electrical components for use in downhole environments. Preferably, these components take advantage of advances in conductive polymers.

SUMMARY OF THE INVENTION

Disclosed is an instrument for performing measurements downhole, the instrument including an inherently conductive polymer (ICP) selected for withstanding conditions downhole.

Also disclosed is a method for fabricating an instrument for use downhole, the method including: selecting at least one inherently conductive polymer (ICP) material for withstanding an environment downhole; fabricating at least a component from the ICP material; and including the component in the instrument.

Further disclosed is an instrument for performing measurements downhole, the instrument including: at least one component including an inherently conductive polymer (ICP) material, the component adapted for at least one of conducting and dissipating an electrical signal associated with the performing while withstanding ambient conditions downhole.

BRIEF DESCRIPTION OF THE DRAWINGS

Referring now to the drawings wherein like elements are numbered alike in the several figures.

DETAILED DESCRIPTION OF THE INVENTION

Figure 1:
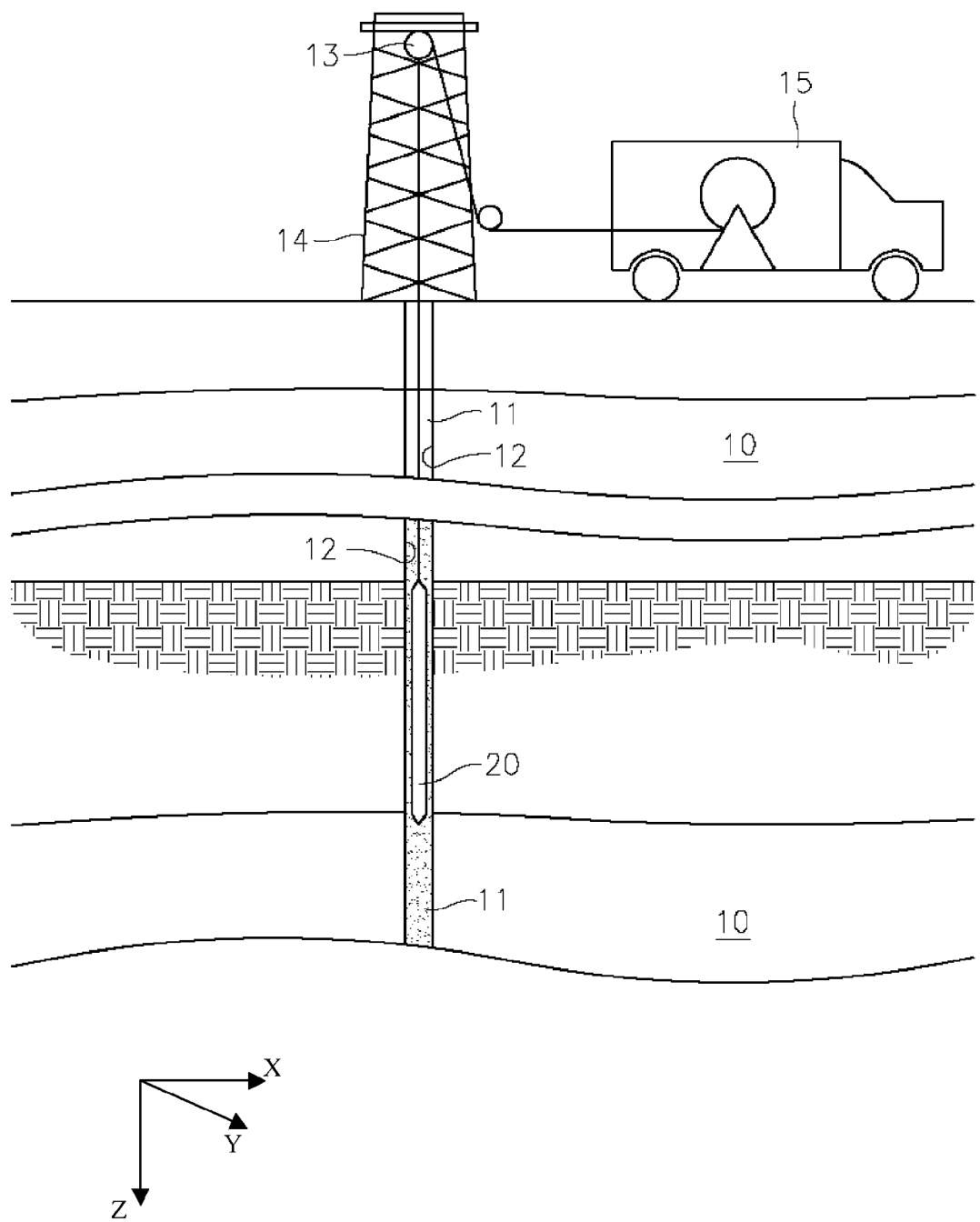
FIG. 1 depicts aspects of well logging and a sampling tool.

The teachings herein provide for use of conductive polymers in geophysical exploration. The conductive polymers provide for various advantages in tools, instruments and other equipment as may be used in geophysical exploration. In particular, use of conductive polymers provides certain advantages in downhole environments, as will become apparent when one skilled in the art considers the disclosure as a whole.

Referring to FIG. 1, a cross-section of earth 10 along the length of a penetration referred to as a "borehole" 11 is depicted. Usually, the borehole 11 is at least partially filled with a mixture of liquids including water, drilling fluid, and formation fluids that are indigenous to the earth formations penetrated by the borehole 11. Suspended within the borehole 11 at the bottom end of a wireline 12 is an instrument 20 for evaluating the earth formations. The wireline 12 is often carried over a pulley 13 supported by a derrick 14. Wireline 12 deployment and retrieval is typically performed by a powered winch carried by a service truck 15.

In general, a coordinate system for describing a location of the instrument 20 includes a Z-axis, a Y-axis and a X-axis. In the embodiments depicted, the Z-axis describes a vertical component of the coordinate system.

A variety of electromagnetic components are used in the instrument 20 or in support of the instrument 20. Although far too numerous to list in entirety, examples include electric and magnetic field antennae, processors, circuit boards, power supplies, storage devices, sensors, wiring, pumps, magnets, displays and many others. Types of electrical components include conductors, semiconductors, magnets, insulators and others.

Accordingly, the teachings herein provide for use of a variety of types of conductive polymers with instruments and equipment used in a downhole environment. Exemplary instruments include various instruments available from Baker Hughes, Incorporated of Houston Tex.

In general, the instruments and equipment include materials that employ conductive polymers in conjunction with other materials. For example, the conductive polymers are used together with high temperature substrates (e.g., glass, epoxy, etc.) to obtain materials with controlled electrical conductivity. Such embodiments are typically used to preserve predictable electrical properties at elevated downhole temperatures. As such, traditional components used in downhole applications can be manufactured using conventional molding techniques, with appropriate substitutions of conducting polymers.

Various exemplary embodiments and implementations for systems and methods implementing conductive polymers in downhole applications are now provided. As discussed herein, "conductive polymers" refers to inherently or intrinsically conductive polymer materials that provide for some degree of electrical conductivity. Non-limiting examples include polyacetylenes, as well as polypyrrole, polyaniline, poly(3,4-ethylenedioxythiophene) and derivatives.

Although other polymer materials are known to conduct electricity, these generally include mixtures of materials such as high temperature polymers with conductive materials mixed therein as additives. Examples of such conductive materials for mixing include carbon black, carbon nanotubes, nano-particles, metal particles and others. In general, the conductive materials referred to herein include those conductive polymers generally referred to as "Inherently Conducting Polymers," and "Intrinsically Conducting Polymers," (ICP's), as opposed to those composite materials that make use of conductive additives. However, one skilled in the art will recognize that certain embodiments disclosed herein may use polymer mixtures in place of or in addition to the ICPs.

The conductive polymers may be zero band gap conductive polymers, mixtures thereof, oxidized, doped and un-doped embodiments thereof, and otherwise formed or classified. The physical form of the conductive polymers may include, without limitation, powders, fibers, plastics, films, laminates, cloth, rods, blocks, woven and non-woven materials and others. In general, the conductive polymers provide at least one of high conductivity, high transparency, high stability and easy processing. The "conductive polymers" are generally amenable to traditional manufacturing techniques used with polymer materials and technologies.

An example of a technology that can make use of conductive polymers for various advantages includes nuclear magnetic resonance (NMR). NMR measurements are commonly used in downhole applications to determine aspects of stationary fluid in the reservoir rock. In these techniques, magnetic fields are established in the formation using suitably arranged permanent magnets. These magnetic fields induce nuclear magnetization, which is flipped and otherwise manipulated using on-resonance radio frequency (RF) pulses. NMR echoes are observed, and their dependence (of their magnitude) on pulse parameters and on time is used to extract information about the formation and the fluids within. It is known that in certain circumstances the RF pulses used in NMR can induce an acoustic ringing in permanent magnets and tool supporting structure. Although there are several causes and associated descriptions of acoustic ringing, one major effect is caused by the presence of a metallic material containing permanent magnetic moments in close proximity within the coil generating said RF pulses. As such, thick conductive three-dimensional (3D) and highly acoustically dissipative fabrics implementing conductive polymers can be implemented for use with NMR-type of magnets in downhole applications, thereby providing for various embodiments of anti-ringing shields.

In another exemplary embodiment, NMR logging instruments and methods for determining, among other things, porosity, hydrocarbon saturation and permeability of the rock formations make use of conductive polymers. The NMR instruments are used to excite the nuclei of the liquids in the geological formations surrounding the wellbore so that certain parameters such as nuclear spin density, longitudinal relaxation time and transverse relaxation time of the geological formations can be measured. From such measurements, porosity, permeability and hydrocarbon saturation are determined, which provides valuable information about the make-up of the geological formations and the amount of extractable hydrocarbons. Anti-ringing shields for high power magnetic instruments such as NMR logging instruments can likewise make use of conductive polymers. These shields can provide for proper dissipation of the RF field and excellent mechanical dumping of induced mechanical ringing.

In exemplary embodiments of wireline logging, wireline induction measurements are used for gathering information used to calculate electrical conductivity or resistivity of the formation. A dielectric wireline tool is used to determine the dielectric constant and/or resistivity of an earth formation. This is typically done using measurements, which are sensitive to the volume near the borehole wall. In measurement-while-drilling/logging-while-drilling (MWD/LWD), a MWD/LWD resistivity tool is typically employed. Such devices are often called "propagation resistivity" or "wave resistivity" tools, and they operate at frequencies high enough that the measurement is sensitive to the dielectric constant under conditions of either high resistivity or a large dielectric constant (both formation and borehole fluid). In MWD applications, resistivity measurements may be used for the purpose of evaluating the position of the borehole with respect to boundaries of the reservoir such as with respect to a nearby shale bed. The same resistivity tools used for LWD may also be used for MWD; but, in LWD, other formation evaluation measurements including density and porosity are typically employed.

Typically, the electrical conductivity of an earth formation is not measured directly. It is instead inferred from other measurements either taken during (MWD/LWD) or after (Wireline Logging) the drilling operation. In typical embodiments of MWD/LWD resistivity devices, the direct measurements are the magnitude and acquired phase shift of a transmitted electromagnetic signal traveling past a receiver array. In commonly practiced embodiments, the transmitter emits magnetic signals of frequencies typically between four hundred thousand and two million cycles per second (0.4 MHz to 2.0 MHz). Two induction coils spaced along the axis of the drill collar having magnetic moments substantially parallel to the axis of the drill collar typically comprise the receiver array. The transmitter is typically an induction coil spaced along the axis of a drill collar from the receiver with its magnetic moment substantially parallel to the axis of the drill collar. A frequently used mode of operation is to energize the transmitter for a long enough time to result in the signal being essentially a continuous wave (only a fraction of a second is needed at typical frequencies of operation). The magnitude and phase of the signal at one receiving coil is recorded relative to its value at the other receiving coil. The magnitude is often referred to as the attenuation, and the phase is often called the phase shift. Thus, the magnitude, or attenuation, and the phase shift, or phase, are typically derived from the ratio of the voltage at one receiver antenna relative to the voltage at another receiver antenna.

As such, inherently conducting polymers can be implemented to create various shapes for building calibration set-ups to be used in resistivity and induction. These tools to be used for calibrating electromagnetic instruments exhibit volume or surface conductivities close to those volume and surface conductivities met in real downhole conditions.

In other embodiments, deployable measuring devices, commonly referred to as "pads" include electrodes for contacting the wellbore and studying formation conductivity through measurement of the electrical current to be injected from said electrodes. In these embodiments, use of conductive polymers are advantageous in that electrodes using such materials may adjust shape about the formation, provide for improved electrical contact, be easy replaceable and thus introduce a substantial saving in the pad manufacturing and maintenance.

In other embodiments, conductive polymers are used in a "wired pipe" or "drill pipe." An exemplary drill pipe is disclosed in the publication entitled "Intelligent Drill Pipe Improves Drilling Efficiency, Enhances Well Safety and Provides Added Value," 2004 IADC World Drilling Conference, Jellison et al, the disclosure of which is incorporated herein by reference in its entirety. In these embodiments, the conductive polymers are useful for replacing, among other things, the inductive loops and the line couplers. Use of conductive polymers for these embodiments provides, among other things, conductors having flexibility which are relatively inert to various environmental conditions (such as acidic or caustic environments).

As one skilled in the art will imagine, conductive polymers are useful in a variety of telemetry systems as well. Typically, the conductive polymers are used where resistance to environmental degradation or flexibility is advantageous. Implementations may include a conductive polymer core surrounded by a non-conductive polymer, essentially forming an insulated "wire" or an insulated conductive element.

For similar reasons, conductive polymers are useful in various embodiments of sensors. For example, where a traditional metallic sensor has been immersed in formation fluids (such as for evaluation of resistivity), corrosion of the metallic portion often occurs. In situations where corrosion is an issue, use of conductive polymers provide for longer life sensors, provide greater signal stability and other advantages not found in metallic conductors. In these and similar embodiments, the ICP is adapted for limited degradation in light of ambient environmental conditions (such as poor pH conditions, high temperature, etc, . . . ).

In some embodiments, such as where the conductive polymers are used as a part of a sensor, the conductive polymers may be coupled to a conductor of a metallic material or a metal. That is, in some embodiments, the conductive polymer may be used as a protective and conductive element. In some of these embodiments, the conductive element is in electrical communication with a remaining portion of the sensor. In short, an electrode for a sensor may include both a conductive polymer and a metallic conductor. Bonding of the two materials is typically provided for using techniques as are known in the art, such as through mechanical (such as by an interlock design) or chemical techniques (such as a conductive glue).

In other exemplary embodiments, plasmas can be generated in various ways including DC discharge, radio frequency (RF) discharge, and microwave discharge. DC discharges are achieved by applying a potential between two electrodes in a gas. RF discharges are achieved either by electrostatically or inductively coupling energy from a power supply into a plasma. Parallel plates are typically used for electrostatically coupling energy into a plasma. Induction coils are typically used for inducing current into the plasma. Microwave discharges are achieved by directly coupling microwave energy through a microwave-passing window into a discharge chamber containing a gas. Microwave discharges are advantageous because they can be used to support a wide range of discharge conditions, including highly ionized electron cyclotron resonant (ECR) plasmas. Inherently conductive polymers may be used in plasma generation systems, for example, as an induction coil or as at least one of the parallel plates.

Faraday shields have been used in inductively coupled plasma sources to contain the high electrostatic fields. However, because of the relatively weak coupling of the drive coil currents to the plasma, large eddy currents form in the shields resulting in substantial power dissipation.

As such, electrostatic shields (commonly referred to as a "faraday cage") used for induction coils can implement conductive polymers having anti-static coating for induction coils in lieu of conventional shields. In one exemplary implementation, a faraday shield sleeve is sprayed with conductive polymers from the inside of the sleeve.

In other exemplary embodiments, flexible circuits can be implemented in downhole test and measurement equipment. A basic flexible circuit is made of a flexible polymer film laminated to a thin sheet of copper that is etched to produce a circuit pattern. In general, traditionally soldered components present printed circuit boards can be replaced with glued components implemented inherently conductive polymers, thereby retaining predictable electrical properties that can withstand the downhole conditions as discussed above. As such, for example, thermal shocks while soldering can be avoided. Furthermore, assembly of critical electronic/electrical components that can be damaged due to thermal shock when conventional soldering has been used can be achieved.

Furthermore, fabrication of inexpensive printed circuit boards with glued electronic components can also be achieved. For example, flexible plastic circuit boards with conductive polymer traces having improved reliability under harsh conditions, such as those from vibration during logging while drilling conditions can be implemented.

In another exemplary embodiment, conductive polymer ink can make the traces on a flexible printed circuit boards. In an exemplary implementation, fabrication steps for many types of flexible circuits, etching the circuit layers, adding a layer of metal for the wiring, and etching that to shape, can all be accomplished with relatively cheap and widely available technologies used to print ink on paper.

It is therefore appreciated that conductive polymers can be implemented in a variety of downhole applications. Conductive polymers can therefore be used for the following components, including, but not limited to: polymeric transistors and electronics; corrosion control materials; inexpensive, one-use electronics like radio frequency identification (RFID); conducting enclosures, etc.

Fabrication of instruments, components and materials for use with the instrument and that include conductive polymers may use techniques such as laminating, coating, spraying, melting, gluing, molding, layering, printing, cutting, crimping, bonding, extruding and other such techniques to apply or form the conductive polymer materials.

Accordingly, in an exemplary method of fabrication of a downhole instrument using inherently conductive polymers (ICP), a user may first select at least one ICP material, and then fabricating at least a component of the instrument from the ICP material. The component may then be included into the instrument. As one might imagine, the selection may consider environmental factors such as temperature and pressure, as well as other factors such as conductivity requirements and mechanical stress to the component when in use.

Methods making use of the materials disclosed herein may be embodied into a system that operates in real time or near real time in order to provide timely information to personnel at the site of the formation. This information may then be used in order to influence interventions or to provide additional safety measures, as previously described.

Disclosed is an instrument for performing measurements downhole, the instrument including a conductive polymer. Exemplary embodiments making use of conductive polymers include embodiments where a conductive element is immersed in a harsh environment, as well as various embodiments of telemetry systems such as wired pipes. In these and other embodiments, conductive polymers provide advantageous ways of conducting electrical signals or shielding from electromagnetic noise while providing for flexibility and limitation of degradation from ambient environmental conditions.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A logging system for performing measurements downhole, the system including:
   a surface component; and
   a downhole component configured to communicate with the surface component over a communication medium, the downhole component including one or more electrodes for contacting a wall of a borehole at least partially formed of an inherently conductive polymer (ICP) selected for withstanding conditions experienced by the downhole component while performing downhole measurements.

2. The as in claim 1, wherein the downhole component further includes a portion formed of at least one high temperature polymer with a conductive material mixed therein as an additive.

3. The instrument as in claim 1, wherein the ICP material comprises at least one of an olyacetylene, polypyrrole, polyaniline, poly(3,4-ethylenedioxythiophene) and a derivative of at least one of the foregoing materials.

* * * * *